United States Patent [19]

Horiguchi et al.

[11] Patent Number: 4,853,747
[45] Date of Patent: Aug. 1, 1989

[54] COPYING APPARATUS EXPOSURE DEVICE

[75] Inventors: Masashi Horiguchi; Minoru Yakubo, both of Tokyo; Yoshikazu Tamura; Mamoru Ogasawara, both of Saitama, all of Japan

[73] Assignee: Fuji Photo Film Co., Ltd., Kanagawa, Japan

[21] Appl. No.: 181,125

[22] Filed: Apr. 13, 1988

[30] Foreign Application Priority Data

Apr. 13, 1987 [JP] Japan .................. 62-90551

[51] Int. Cl.⁴ .................. G03B 27/48; G03B 27/50; G03B 27/70
[52] U.S. Cl. .................. 355/51
[58] Field of Search .................. 355/27, 28, 29, 45, 355/51, 71

[56] References Cited

U.S. PATENT DOCUMENTS

| 3,992,089 | 11/1976 | Hirose et al. | 355/45 X |
| 4,129,376 | 12/1978 | Yotsukura | 355/51 X |
| 4,488,803 | 12/1984 | Nishihama et al. | 355/51 X |
| 4,576,469 | 3/1986 | Shiga et al. | 355/54 X |
| 4,627,703 | 12/1986 | Suzuki et al. | 355/71 X |
| 4,723,151 | 2/1988 | Sonezaki et al. | 355/27 |

Primary Examiner—Richard A. Wintercorn
Attorney, Agent, or Firm—Sughrue, Mion, Zinn, Macpeak & Seas

[57] ABSTRACT

An exposure device effects a slit exposure to a photosensitive sheet material moving over an exposure station, and includes two pairs of conveyor rollers disposed on opposite sides of the exposure station. The two pairs of conveyor rollers first convey a photosensitive sheet material forward, passing over the exposure station until one of the two pairs of conveyor rollers holds the trailing end of the photosensitive sheet flat therebetween. Prior to making an exposure, the two pairs of conveyor rollers are rotated in a reverse direction to move the photosensitive sheet back. After the trailing end of the photosensitive sheet is grabbed by the other of the two pairs of conveyor rollers, a shutter is actuated to effect an exposure to the photosensitive sheet with a slit line exposure light while the photosensitive sheet is being moved back, trailing end first.

8 Claims, 6 Drawing Sheets

COPYING APPARATUS EXPOSURE DEVICE

BACKGROUND OF THE INVENTION

The present invention relates to an exposure device used in a silver salt photographic type copying apparatus.

Silver salt photographic type copying machines can provide high quality copies compared to electronic copying apparatuses. Silver salt copying apparatuses are classified into two or more groups, including: a slit exposure type and a camera type corresponding to the exposure system; a diffusion transfer type using diffusion transfer photographic materials; a direct positive image forming type using direct positive photographic materials; and a reversal developing type using reversal films corresponding to the image forming process.

Diffusion transfer type copying apparatuses use two separate diffusion transfer photographic materials: a negative or photosensitive material, in which a latent image is created as a result of exposure; and a positive or image-receiving material where the positive image is formed.

One such diffusion transfer type copying apparatus is disclosed in Japanese Patent Unexamined Publication No. 59-204042, in which a roll-shaped negative or photosensitive material contained in a magazine is withdrawn and cut into sheets of a predetermined length. Each photosensitive sheet is placed and held flat on an exposure stage in order to be exposed. After exposure, the photosensitive material is superimposed onto a positive or image-receiving material in the form of a sheet withdrawn from a cassette, and while superimposed is passed through a developing reagent and then held in a storing chamber for a while for diffusion transfer processing. Thereafter, the image-receiving sheet is peeled away from the photosensitive sheet upon the completion of diffusion transfer processing. A positive transfer image is formed on the image-receiving sheet. After being washed and dried the image-receiving sheet is removed from t he copying apparatus.

A camera type copying apparatus is known, such as that in Japanese Unexamined Published Patent Application No. 61-138 955. in which a roll of photosensitive material and a sheet of image-receiving material are used.

The conventional diffusion transfer type copying apparatus is deficient in that a large area is needed for the exposure stage, because a photosensitive sheet to which the photosensitive material is cut off is placed on an exposure stage and exposed either by a slit exposure light or by a frame exposure. Further, as the size of the photosensitive sheet increases it becomes difficult to keep the photosensitive sheet flat on the exposure stage.

SUMMARY OF THE INVENTION

In view of the foregoing deficiencies, it is an object of the present invention to provide an exposure device which can maintain a photosensitive material flat on an exposure stage of a copying apparatus.

The foregoing and other objects of the present invention are achieved by providing an exposure device with two pairs of conveyor rollers disposed on opposite sides of an exposure stage where a slit exposure is made. One pair of the conveyor rollers grasp one end of a photosensitive material prior to exposure and conveys that end toward the other pair of conveyor rollers. When the other pair of conveyor rollers grasp the photosensitive material, a shutter is opened to make a slit exposure for the photosensitive material while the photosensitive material is moved.

In accordance with a preferred embodiment of the present invention, the photosensitive material is grabbed by the conveyor rollers which are disposed before the exposure stage. When copying starts both pairs of rollers are rotated simultaneously. The conveyor roller pair before the exposure stage transport the photosensitive material with a light pressure so as to cause it to be grabbed by the pair of conveyor rollers located after the exposure stage. These pairs of conveyor rollers hold the photosensitive material flat over the exposure stage. When the speed of movement of the photosensitive material becomes stable, the shutter is actuated to expose the photosensitive material while the photosensitive material is moved. The actuation of the shutter is delayed by an amount of time necessary to transport the photosensitive material by a predetermined length from the commencement of transportation of the photosensitive material.

BRIEF DESCRIPTION OF THE DRAWINGS

The invention now will be described in detail with reference to the accompanying drawings, in which.

DETAILED DESCRIPTION OF THE PREFERRED EMBODIMENT

Figure 1:
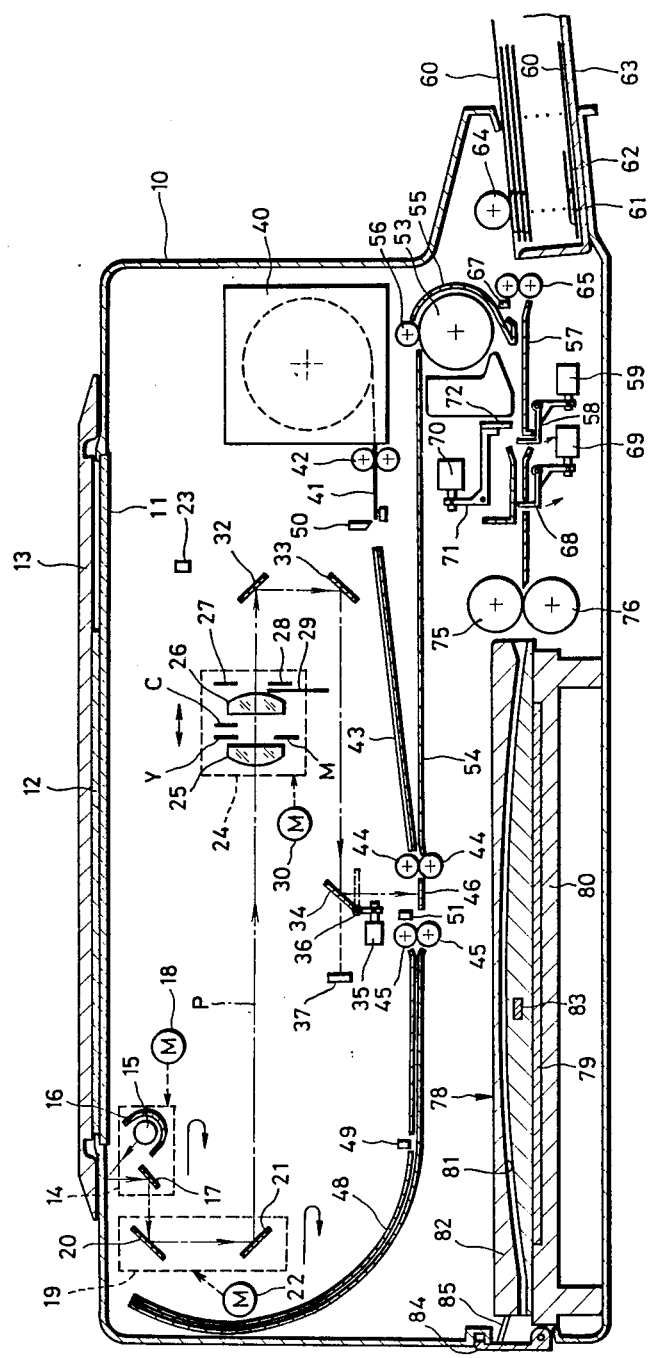
FIG. 1 is a schematic illustration of a copying apparatus embodying the present invention.

FIG. 1 shows a silver salt type color copying apparatus 10. On top of the copying apparatus 10 there is a transparent table 11 on which a color original 12 from which a copy is made is placed face down and is covered by a cover plate 13 with a white inner surface.

An illumination light unit 14, which includes therein an illumination lamp 15, a reflector 16 and a reflection mirror 17, is moved back and forth parallel to the transparent table 11 by a motor 18 to scan the color original 12 with, for example, an illumination light formed in the shape of a line by a slit member (not shown).

Adjacent to the illumination light unit 14, there is a mirror unit 19 having two mirrors 20 and 21 disposed at right angles to each other to reflect light from the illumination light unit 14 in a direction parallel and opposite to the angle of incidence at the mirror 20. The mirror unit 19 is synchronized with the illumination light unit 14 to move back and forth at one-half the speed of the illumination light unit 14 by means of a motor 22 coupled thereto through a driving wire (not shown), thereby to maintain a constant subject distance. This mirror unit 19 has its position adjustable relative to that of the illumination light unit 14 when copying magnification needs to be changed. Under one end of the transparent table 11, there is a sensor 23 such as a microswitch to detect the illumination light unit 14 at the end of scanning.

A lens unit 24 has front and rear lens groups 25 and 26 (which are shown as single-element lens groups for simplicity), three color filters namely yellow Y. cyan C. and magenta M, disposed between the front and rear lens groups, and aperture plates 27 and 28 disposed behind the rear lens group 26 and movable in mutually opposite directions. Each of the color filters Y, C, M are insertable into and out of an optical axis P of the lens unit 24 independently of the other two to regulate the amount of exposure light passed therethrough in order to control the three color components of light, and hence the balance of exposure light. Although each of these color filters Y, C and M may be movable independently of the other two in this preferred embodiment, they can be replaced with two color filters attached to a slidable transparent plate, as is shown in Japanese Patent Publication No. 44-2542, for example.

Meanwhile, inks used for printing color articles generally have a sensitivity distribution with a peak at about 570nm for green. Dyes used for making photographic color prints have a sensitivity distribution with a peak at about 535 nm for green. On the other hand, the photosensitive material used in this embodiment has a sensitivity distribution with a peak about 560 nm for green. In order to make copies from a printed article and a photographic print under the same copying conditions, a green elimination filer 29 is retractably disposed between the rear lens group 26 and the apertures 27 and 28 to cut partially green light having relatively longer wavelengths by reflection or absorption. This green elimination filter 29 is moved out of the optical path P when the illumination light unit 14 scans the color original 12 to detect the density of the color original 12 prior to copying. It is to be understood that, if using a photographic material having a green sensitivity distribution with a peak at a relatively short wavelength for example 540 nm. the green elimination filter 2g is not used. When the green elimination filter 29 is placed completely in the optical path P then the aperture plates 27 and 28 move close to each other to regulate the amount of light. The lens unit 24 is moved along the optical path P to vary magnification ratio.

Fixed mirrors 32 and 33 and a swingable mirror shutter 34 direct the light reflected from the color original 12 to an exposure stage 46. The swingable mirror shutter 34 is brought out of the optical path P by being turned about a shaft 36 when a solenoid 35 is energized so as to allow the light reflected from the color original 12 to be directed to a light measurement unit 37.

There is a magazine 40 containing a roll of a photosensitive material 41 which can be processed in a diffusion transfer process. The photosensitive material 41 is withdrawn by withdrawing means in the form of a pair of rollers 42 disposed in front of the magazine 40. Either one of the pair of conveyor rollers 42 is adapted to move slightly up and down while being rotated thereby to prevent the photosensitive material 41 from being deflected sideways.

The photographic material 41 withdrawn from the magazine 40 is guided along its opposite sides by means of guide rails 43 in the form of a U-shaped channel. This guide rail 43 is inclined upwardly at an angle and is deviated at its forward end upwardly from the center between a pair of conveyor rollers 44 in the form of a wide hollow drum which grasp and apply a weak force to the photosensitive material 41 to prevent it from being fogged due to pressure.

Figure 2:
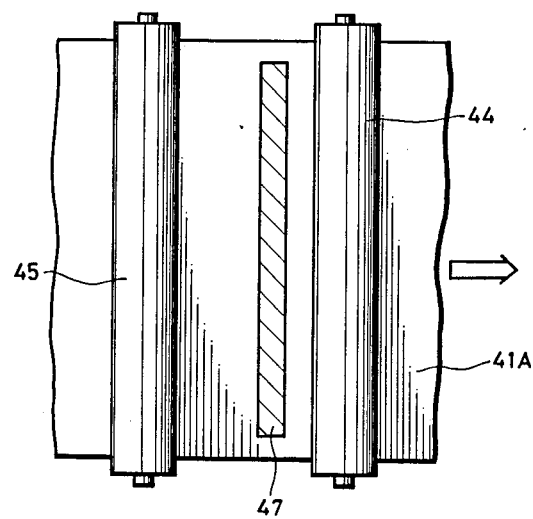
FIG. 2 is a plan view of a photosensitive material grasped by two pairs of conveyor rollers.

FIGS. 1 and 2 show a pair of conveyor rollers 45 facing the pair of conveyor rollers 44. Between these conveyor rollers 44 and 45, there is formed an exposure stage 46 to which a line exposure light 47 is directed by means of the mirror shutter 34 when a copy is being made. These pairs of conveyor rollers 44 and 45 are synchronized with the withdrawing rollers 42 so as to force and convey the photosensitive material 41 through an upwardly-curved passage 48. This passage is defined by a hollow chute having a thin rectangular cross section, and made of plastic or steel. The curved nature of the passage 48 contributes to shortening the overall length of the copying apparatus. If there is no upper space for the curved passage 48, the passage may be curved downwardly. The passage also may be formed by using a plurality of rollers and guide members.

Figure 6:
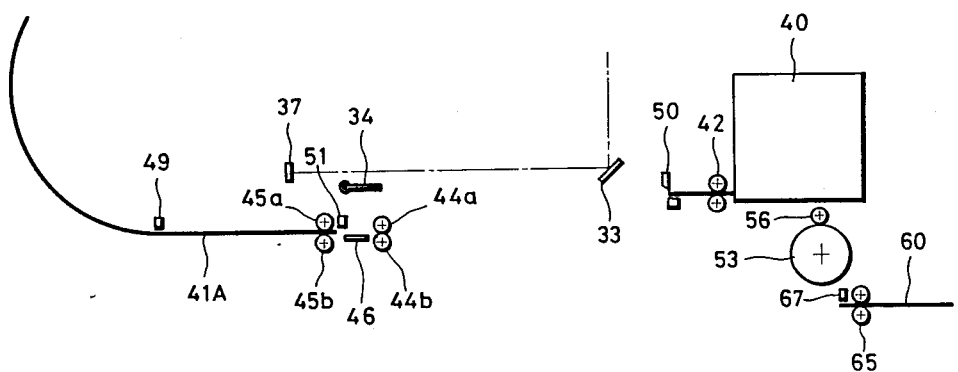

When the photosensitive material 41 is detected at its leading end by a sensor 49, a cutter 50 cuts the photosensitive material 41 into a predetermined length of photosensitive sheet 41A (See FIG. 6, for example). The photosensitive sheet 41A is further conveyed by the conveyor rollers 44 and 45 until a sensor 51 detects the rear end of the photosensitive sheet 41A at which time all the conveyor rollers stop their rotation.

When making a color copy from the color original 12, the conveyor rollers 44 and 45 are rotated in the reverse direction in synchronism with the movement of the illumination light unit 14 so as to move back the photosensitive sheet 41A toward a rotary drum 53, exposing it rear end first at the exposure stage 46.

As is shown in detail in FIG. 1 between the conveyor rollers 44 and the rotary drum 53 there is a guide plate 54 disposed in a horizontal plane between the conveyor rollers 44. Because, as previously described, the guide rails are deviated upwardly at one end, the photosensitive sheet 41A is prevented from being caught by the guide rails 43 and smoothly enters between the guide rails 43 and the guide plate 54. At this time, although the rear end of the photosensitive sheet 41A is slightly curled due to its elasticity, the photosensitive sheet 41A can be smoothly conveyed without being caught at its rear end by the horizontally displaced guide plate 54. Therefore, there is no change of load exerted on conveyor rollers 44 and 45 so that the rollers 44 and 45 do not slip, and no dark strips appear on a color copy.

A curved guide member 55 is disposed around an outer periphery of the rotary drum 53, and a roller 56 contacts that outer periphery. The rotary drum 53 advances and turns the photosensitive material 41 along the curved guide member 55 until the rear end of the photosensitive sheet 41A is stopped by a first stopper 58. This stopper 58 places the photosensitive sheet 41A in position and then is retracted under a guide plate 57 by means of a solenoid 59.

A cassette 63 is mounted on the copying apparatus 10. In this cassette 63 there is a stack of a plurality of sheets 60 of positive materials or image-receiving materials each of which is provided near its leading end with a rupturable pod 61 containing a processing reagent therein, and a funnel member 62 in the form of an envelope for leading the processing reagent released from the pod 61. An extrusion roller 64 is brought into contact with the uppermost image-receiving sheet 60 when the cassette 63 is mounted on the copying apparatus 10 and extrudes it toward a pair of feed rollers 65. When a sensor 67 disposed adjacent to the feed rollers 65 detects the leading end of the image-receiving material 60, the extrusion roller 64 stops. After this, the photosensitive material 41 is withdrawn from the magazine 40 as previously described.

After the exposed photosensitive sheet 41A is placed in position by the first stopper 58, the extrusion roller 64 and the feed rollers 65 rotate again advancing further the uppermost image-receiving sheet 60 until the leading end of the image-receiving sheet 60 is stopped by a second stopper 68 cooperating with a solenoid 69, thereby placing the image-receiving sheet 60 under the photosensitive sheet 41A. The extrusion roller 64 is formed to contact only side margins of the image-receiving sheet 60 so as not to rupture the pod 61. The feed rollers 65 are made of spongy material, to apply a light pressure against the photosensitive sheet 60 in order not to rupture the pod 61 and to isolate the inside of the apparatus from ambient light. It also is to be noted that these photosensitive and image-receiving sheets 41A and 60 have the same material and layer construction as peel-apart type instant film units now being sold.

When the image-receiving sheet 60 is placed in position by the second stopper 88 a solenoid 70 is actuated to move down a lever 71 with a sealing means 72 attached to one end to connect the ends of the photosensitive sheet 41A and the image-receiving sheet 60. Because of this connection, the two separate sheets are superimposed and maintained in registry. For more positive connection, a hot melt cementing reagent preferably is previously applied onto the funnel 62.

The superimposed sheets 41A and 60 are passed between a pair of processing rollers 75 and 76 to rupture the pod 61. As the superimposed sheets are advanced by the processing rollers 75 and 76, the processing reagent released from the pod 61 is spread and distributed in a uniform layer between the superimposed sheets 41A and 60. The superimposed sheets 41A and 60 then are conveyed to a heating section 7B to be heated at a predetermined temperature for a while. This heating section 78 includes a heater 79 incorporated in a table 80 and a plate 82 maintained at a constant temperature. After a predetermined time, a door 84 is opened to withdraw the top end of the plate 82 from the apparatus through a lever 85. A sensor 83 detects the temperature of the heater 79.

Figure 3:
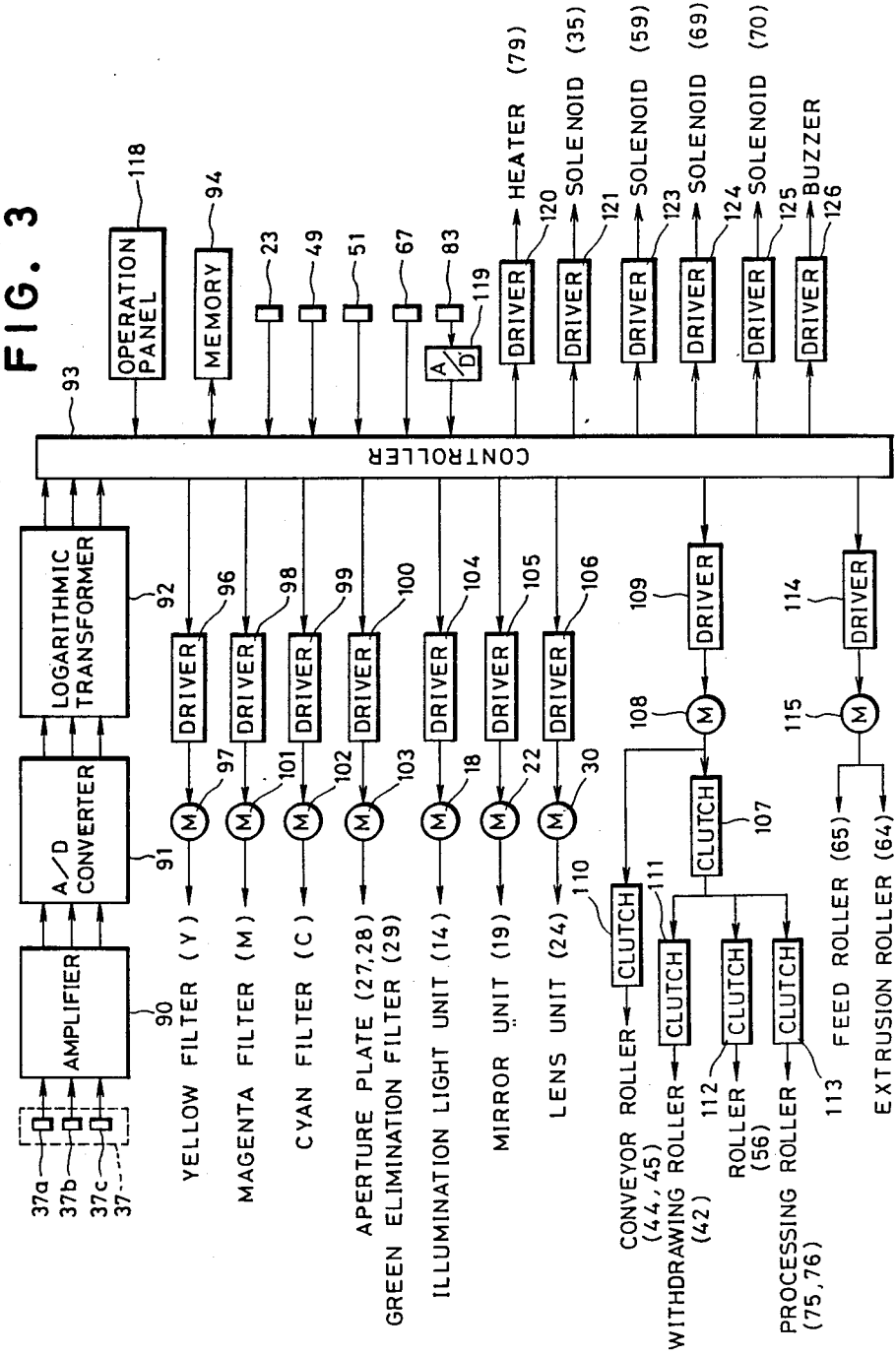
FIG. 3 is a block diagram of a control circuit for the copying apparatus of FIG. 1.
Figure 4:
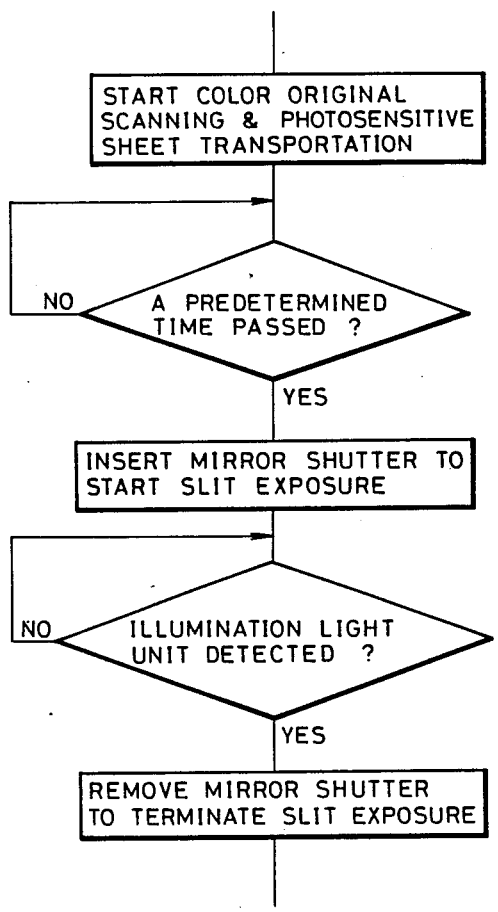
FIG. 4 is a flow chart showing a sequential control of operation for photosensitive material.

The just-described apparatus works in cooperation with a circuit shown in FIG. 3. The light measuring unit 37 comprises respective blue green, and red light sensors 37a. 37b and 37c for detecting light intensities of those three components of exposing light. Outputs from these three light sensors 37a to 37c are amplified by an amplifier 90 and then are converted into digital signals by an A/D converter 91. The digital signals then are logarithmically transformed by a logarithmic transformer 92 to provide density signals for three colors which in turn are written in a memory 94 through a controller 93. The controller 93 operates various sections to effect a sequential control of operation, a program for which is stored in the memory 94.

According to the density signals from the light measuring unit 37, the controller 93 causes a driver 96 to rotate a motor 97, for adjusting the position of the yellow filter (Y). In the same way, the controller 93 causes drivers 98 to 100 to rotate respective motors 101 to 103 to adjust positions of the magenta and cyan absorption filters (M). (C). and the aperture plates 27 and 28 and the green elimination filter 29. Motors 18, 22 and 30 cooperate with drivers 104 to 106, to control movement of the illumination light unit 14 mirror unit 19 and lens unit 24, respectively connected to the controller 93. A motor 108 connected to the controller 93 through a driver 109 is rotatably coupled to the conveyor rollers 44 and 45 through a clutch 110 and the feed rollers 42, the roller 56 and the processing rollers 75 and 76 through clutches 107 and 111 to 113 respectively. A motor 115 connected to the controller 93 through a driver 114 is rotatably coupled to the extrusion roller 64 and feed rollers 65.

An operation panel 118, connected to the controller 93, is provided with a copying key for starting a copy, color correction keys for manually effecting color balance corrections, density correction keys for manually effecting density corrections, as well as other keys. The temperature sensor 83 detects a temperature of the heating section 78 to provide a signal which in turn is converted into a digital signal by an A/D converter 119 and is sent to the controller 93. Drivers 120 through 125 connected to the controller 93 drive the heater 79 and solenoids 35. 59 69 and 70, respectively. A driver 126 causes a buzzer to sound after a predetermined development time.

The sequential control of operation of the copying apparatus according to the present invention now will be described in detail with reference to FIGS. 4 through 9. As in shown in the flow chart of FIG. 4 first the color original 12 is placed on the transparent table 11 and is covered by the cover plate 13. The copying key on the operation panel 118 is operated to start a program control of operation. When the copying key is operated, the motors 97. 101 and 102 are started to set the color filters (Y). (M) and (C) to their initial positions. Simultaneously, the motor 103 is started to move the green elimination filer 29 out of the optical path P as well as to open fully the aperture plates 27 and 28.

The controller 93 causes the motor 18 to effect a prescanning of the color original 12 while withdrawing an image-receiving sheet 60 from the cassette 63. When the motor 18 is rotated, the illumination light unit 14 is moved together with the mirror unit 12 to scan the color original 12 with a line illumination. The light reflected from the color original 12 is directed toward the light measuring unit 37 through the mirrors 17. 20 and 21 and the lens unit 24, and then the mirrors 32 and 33, in this order. The light measuring unit 37 comprising the blue, green and red sensors 37a to 37c detects the three color components of the reflected light to provide signals which are then amplified converted into digital signals and logarithmically transformed into density signals. The density signals are stored in the memory 94.

During pre-scanning the motor 115 is actuated to rotate the extrusion roller 64 and the feed rollers 65, to withdraw the top image-receiving sheet 60 from the cassette 63. During the withdrawal of the top image-receiving sheet 60, the leading end of the image-receiving sheet 60 is detected by the sensor 67 when the sheet comes out of the pair of feed rollers 65. The sensor 67 provides a signal which in turn is sent to the controller 93; the controller 93 stops the motor 115. When the sensor 67 detects the leading end of the image-receiving sheet 60, the controller 93 causes the motor 108 to rotate the rollers 42. 44 and 45, to withdraw the photosensitive material 41. If the cassette 63 is empty, the photosensitive material 41 is not withdrawn.

The rollers 42 withdraw the photosensitive material 41 from the magazine 40 and advance it toward the exposure position along the guide member 43. As this guide member 43 is deviated upward with respect to the rollers 44, the photosensitive material 41 strikes the peripheral surface of the roller 44 and is smoothly grabbed by the rollers 44. The photosensitive material 41 is pressed lightly by the rotating conveyor rollers 44, and is forced to move toward the rollers 45. As these rollers 44 and 45 continue to rotate, the photosensitive material 41 enters into the passage 48 and is advanced within the passage 48.

Figure 5:
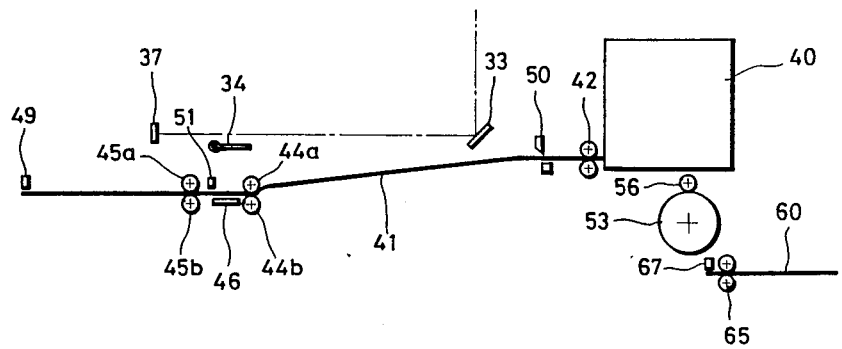
FIGS. 5 through 9 are schematic illustrations of photosensitive and image-receiving material conveyed by conveyor rollers.

As is shown in FIG. 5 when the leading end of the photosensitive material 41 is detected by the sensor 49, rotation of the motor 108 is temporarily suspended, during which time the cutter 50 is actuated to cut the photosensitive material 41 to a predetermined length of photosensitive sheet 41A. After the photosensitive sheet 41A is cut, the motor 108 is started again. However, at this time the rollers 42 are restricted by the clutch 111 (see FIG. 3). and only the conveyor rollers 44 and 45 are allowed to rotate continuously, so that only the photosensitive sheet 41A is advanced while the remaining photosensitive material 41 is left. When the rear end of the photosensitive sheet 41A is detected by the sensor 51 as shown in FIG. 6, the motor 108 is stopped.

When the illumination light unit 14 has moved along the entire length of the color original 12 and is detected by the sensor 23, pre-scanning is completed. In response to the detection of the illumination light unit 14 by the sensor 23, the motor 18 starts to rotate in the opposite direction simultaneously with the turning off of the lamp 15 to return the illumination light unit 14 to its original position.

Following the return of the illumination light unit 14, the controller 93 reads out densities for blue, red and green from the memory 94 to calculate exposures for these three colors. Based on the calculated exposures, the controller 93 causes the motors 97. 101 and 102 to rotate so as to adjust positions of the color filters Y. M and C to regulate the components of the exposing light. At this time the motor 103 also is rotated to place the green elimination filter 29 in the optical path P in order to eliminate a longer wavelength component of green wavelength range of the line illumination light. It should be noted that, because the green elimination filer 29 is shaped as an elongated rectangle an additional movement of the green elimination filter 29 in the optical path P causes the aperture plates 27 and 28 to move close to each other to adjust the amount of the line illumination light. The components and amount of slit illumination light may be controlled manually by operating the color and density correction keys of the operation panel 118.

After the adjustment of the color filters and aperture plates the controller 93 turns on the lamp 15 and causes the motor 18 to rotate, to move the illumination light unit 14 and the mirror unit 19 to the right again as viewed in FIG. 1, thereby to scan the color original 12 with the line illumination light. Simultaneously, the motor 108 has its rotation reversed to rotate the conveyor rollers 44 and 45 in the opposite direction through the clutch 110. As a result, the photosensitive sheet 41A is moved back from a position shown in FIG. 6 at the same speed as that of the illumination light unit 14. Although the rear end of the photosensitive sheet 41A is slightly curled, the pairs of rollers 44 and 45 grasp the rear end of the photosensitive sheet 41A with a light pressure to maintain it flat therebetween. Consequently the photosensitive sheet 41A is moved back over the exposure position.

Following the movement of the photosensitive sheet 41A by the conveyor rollers 44 and 45, the speed of movement of the photosensitive sheet 41A becomes stable. Therefore, the photosensitive sheet 41A is acceptably synchronized with the illumination light unit 14 and also is maintained acceptably flat, so that a highly stable slit exposure to the photosensitive sheet 41A may be performed. To provide such a stable exposure, the mirror shutter 34 is actuated a predetermined time after the start of movement of the photosensitive sheet 41A to effect an exposure thereto.

Figure 7:
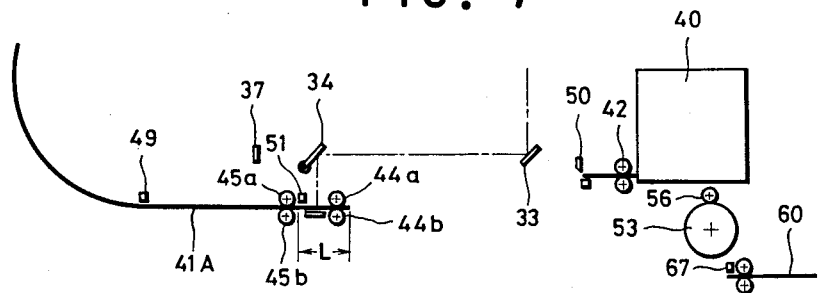
Figure 8:
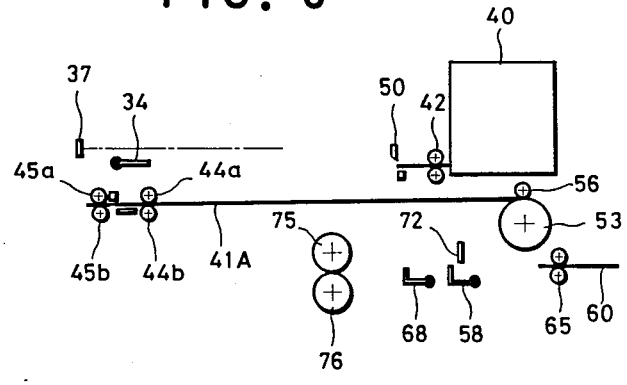

At the beginning of exposure, as shown in FIG. 7, the photosensitive sheet 41A is moved by a distance L so that its read end is placed on the guide member 54 (FIG. 1). Because the guide member 43 is deviated upwardly from the center of the conveyor rollers 44, the photosensitive sheet 41A can enter between the guide members 43 and 54 without being caught by the guide member 43, and thus can move smoothly over the guide member 54. During exposure, exposing light reflected from the color original 12 passes through the lens unit 24 and is reflected downwardly by the mirror shutter 34. Thereafter, the exposing light reaches the exposure stage 46 to form a latent image of the color original in the photosensitive sheet 41A.

The photosensitive sheet 41A is moved back at a constant speed along the guide member 54 while being exposed to the slit line exposure light 47 (see FIG. 2). After the sheet 41A reaches the rotary drum 53, it is grabbed between the rotary drum 53 and the roller 56 with a light pressure. Immediately before the photosensitive sheet 41A reaches the rotary drum 53, the sensor 23 detects the position of the illumination light source 14. Consequently the controller 93 causes the solenoid 35 to move the mirror shutter 34 up and out of the optical path P to complete the exposure to the photosensitive sheet 41A.

Although the roller 56 is suspended by the clutch 107 during the reverse rotation of the conveyor rollers 44 and 45, the photosensitive sheet 41A. being thrust by the conveyor rollers 44 and 45, can be grabbed between the roller 56 and the rotary drum 53 by itself. Thereafter, the rotary drum 53 is rotated by the motor 108 through the clutches 107 and 112 to move the photosensitive sheet 41A along the rounded guide member 55 until the end of the photosensitive sheet 41A is stopped by the first stopper 58.

When the photosensitive sheet 41A is stopped by the first stopper 58, a sensor (not shown) provides a signal in response to which the controller 93 stops the reverse rotation of the motor 108. Following the stop of the motor 108, and after energizing the solenoid 59 to remove the first stopper 58 from the guide member 57, the controller 93 causes the motor 115 to start to rotate the extrusion roller 64 and the feed rollers 65, thereby to withdraw the top image-receiving sheet 60 and advance it along the guide member 57. At this time, the photosensitive sheet 41A. having one end between the rotary drum 53 and the roller 56 is maintained flat, with its opposite end placed on the guide member 57.

Because the photosensitive sheet 41A is somewhat stiff, it acts as an upper guide member for the image-receiving sheet 60. As a result the image-receiving sheet 60 can smoothly slip in under the photosensitive sheet 41A. Although the image-receiving sheet 60 is provided with the pod 61 and the funnel 62, the rear end of the photosensitive sheet 41A is not caught by the funnel 62 because the photosensitive sheet 41A is placed in position at the first stopper. When the leading end of the image-receiving sheet 60 is stopped by the second stopper 68, a sensor (not shown) provides a signal in response to which the controller 93 stops the motor 115.

Figure 9:
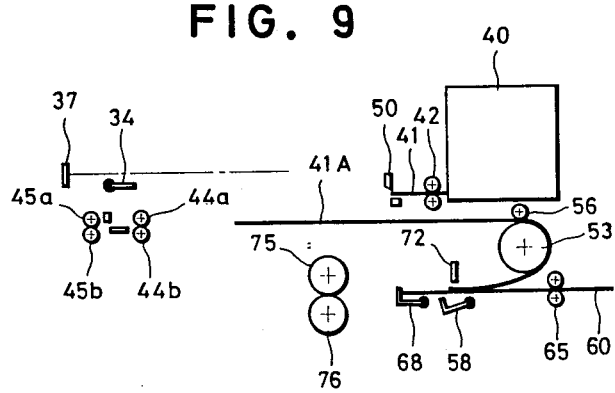

As shown in FIG. 9, when the image-receiving sheet 60 is stopped by the second stopper 68, the funnel 62 of the image-receiving sheet 60 is overlapped by the photosensitive sheet 41A. Thereafter, the controller 93 energizes the solenoid 70 (FIG. 1) to move down the level 71 with the sealing means 72, thereby connecting the end of the photosensitive sheet 41A to the funnel 62 of the image-receiving sheet 60.

After this connection, the second stopper 68 is moved out of the way of the overlapped sheets, and the motor 108 is started to rotate in the reverse direction, rotating the processing rollers 75 and 76 through the clutches 107 and 113. Simultaneously, rotation of the motor 115 also is initiated to rotate the rollers 64 and 65 again, advancing the image-receiving sheet 60. Consequently, the image-receiving sheet 60 is grabbed by the processing rollers 75 and 76. The photosensitive sheet 41A follows the image-receiving sheet 60. As the extrusion roller 64 continues to rotate the next image-receiving sheet 60 is withdrawn from the cassette 63 following the foremost image-receiving sheet 60 and is grabbed by the feed rollers 65. When the sensor 67 detects the next image-receiving sheet 60, the controller 93 causes the motor 115 to stop.

The processing rollers 75 and 76, which are pressed against each other by means of a spring member (not shown) grab and forward the overlapped sheets 41A and 60. At the beginning of this advancement of the overlapped sheets, the processing rollers 75 and 76 rupture the pod 61 to release a developing reagent therefrom and distribute it in a uniform layer between the overlapped sheets 41A and 60. The overlapped sheets between which the developing reagent is distributed enters the passage 81 of the constant temperature plate 82 which is maintained at a predetermined temperature (for example 25° C.) by the temperature sensor 83 and the heater 79.

The overlapped sheets 41A and 60 are left with their ends slightly projecting from the passage 81 for diffusion transfer processing. After a predetermined time, the buzzer sounds to indicate that the diffusion transfer processing of the overlapped sheets is completed. The door 84 is opened to pull the constant temperature plate 82 partial out of the apparatus 10 through the lever 85. After removing the overlapped sheets from the constant temperature plate S2, the image-receiving sheet 60 on which the positive image is formed is peeled away from the photosensitive sheet 41A.

For another copy, another color original is placed on the table 11 and the copying key is operated to start the same sequential control of copying operation. At this time, as the end of the next image-receiving sheet 60 has been grabbed between the feed rollers 65, pre-scanning is immediately started, as is the withdrawal of the photosensitive material 41 from the magazine 40. If the cassette 63 is empty, the sensor 67 produces no signal, and so that controller 93 causes the motor 115 to start its rotation. If there is no image-receiving sheet 60 in the cassette 63, no image-receiving sheet 60 is extruded when the preceding copy is made. In this case as has been described previously, since the sensor 67 produces no signal for a predetermined time of rotation of the motor 115, the controller 93 stops the motor 115 to interrupt the sequential control of copying operation of the apparatus 10 and indicates on a display (not shown) a message that the cassette 63 is empty.

Although the present invention has been described for a diffusion transfer type copying apparatus with respect to the foregoing embodiment, the invention is applicable to other copying apparatuses of the type using silver salt photographic material, such as direct positive image forming photographic materials or the like.

Further, it will be understood that various changes and modifications may be made in the form, details. arrangement and proportion of the above-described parts without departing from the spirit of the present invention. Tea scope of the invention being limited only by the appended claims which follow immediately.

What is claimed is:

1. A copying apparatus exposure device for effecting exposure of photosensitive material, said device comprising:
    an exposure station, disposed in a path of said photosensitive material during said exposure;
    conveyor roller means, disposed in said path on opposite sides of said exposure station for holding said photosensitive material at said exposure station;
    means for transporting said photosensitive material over said exposure station;
    a shutter disposed in an exposure light path between a table on which an original to be copied is placed and said exposure station: and
    control means for opening said shutter when said photosensitive material is grabbed by said conveyor roller means, so as to hold said photosensitive material flat and expose said photosensitive material while said photosensitive material is transported.

2. An exposure device as defined in claim 1, further comprising slit exposure means for providing a slit-shaped light beam for scanning said photosensitive material, wherein said shutter comprises a mirror shutter for reflecting a slit line exposure light incident thereon to said exposure station.

3. An exposure device as defined in claim 1 wherein said conveyor roller means comprises a first pair of conveyor rollers disposed on one side of said exposure station and a second pair of conveyor rollers disposed on an opposite side of said exposure station, wherein said control means controls said conveyor rollers so that one pair of said conveyor rollers holds a sheet of said photosensitive material at a trailing end thereof after said trailing end of said photosensitive sheet material has passed over said exposure station and upon copying, forces said sheet to move toward another pair of said conveyor rollers, so as to expose said sheet with a slit line exposure light starting at said trailing end during a scanning operation.

4. An exposure device as defined in claim 1, further comprising:
    an illumination light unit for providing scanning light on said original
    a mirror unit for reflecting and transmitting light reflected from said original; and
    a lens unit for receiving light reflected from said mirror unit, said lens unit comprising a plurality of filters for effecting color exposure:
    wherein said control means controls movement of said illumination light unit said mirror unit, and said lens unit, and controls movement of said filters into and out of an optical path defined between said mirror unit and said lens unit.

5. An exposure device as defined in claim wherein said control means controls said mirror unit to move at one-half a speed of said illumination light unit during a scanning operation.

6. An exposure device as defined in claim 3, further comprising means for detecting a leading end of said photosensitive material and means, responsive to detection of said leading end, for cutting said photosensitive material into sheets.

7. An exposure device as defined in claim 6, further comprising passage means for retaining at least a portion of said sheets during said scanning operation wherein said conveyor roller means convey said sheets toward said passage means.

8. An exposure device as defined in claim 7, wherein said passage means comprise a hollow chute having a rectangular cross section, said chite being curved upwardly so as to save space in a longitudinal direction of said exposure device.

* * * * *